United States Patent [19]

Sakamoto

[11] Patent Number: 5,182,481
[45] Date of Patent: Jan. 26, 1993

[54] VOICE COIL TYPE ACTUATOR

[75] Inventor: Satoshi Sakamoto, Tokyo, Japan
[73] Assignee: Sony Corporation, Tokyo, Japan
[21] Appl. No.: 879,168
[22] Filed: May 1, 1992

Related U.S. Application Data

[63] Continuation of Ser. No. 701,811, May 17, 1991, abandoned.

[30] Foreign Application Priority Data

May 28, 1990 [JP] Japan .................. 2-137614

[51] Int. Cl.$^5$ .................. H02K 41/00; G02B 7/02
[52] U.S. Cl. .................. 310/13; 310/15;
354/195.12; 359/824
[58] Field of Search .................. 310/12, 13, 15, 154,
310/65 B; 354/900, 195.12; 384/192, 194

[56] References Cited

U.S. PATENT DOCUMENTS

| | | | |
|---|---|---|---|
| 3,723,779 | 3/1973 | Gillum | 310/13 |
| 4,245,917 | 1/1981 | Mosciatti et al. | 400/144.2 |
| 4,439,700 | 3/1984 | Menzel et al. | 310/13 |
| 4,560,263 | 12/1985 | Katsuma et al. | 354/195.1 |
| 4,589,753 | 5/1986 | Kawai | 354/400 |
| 4,692,999 | 9/1987 | Frandsen | 29/596 |
| 4,705,311 | 11/1987 | Ragard | 29/740 |
| 4,785,210 | 11/1988 | Maruyama et al. | 310/12 |
| 4,828,360 | 5/1989 | Maruyama | 350/255 |

FOREIGN PATENT DOCUMENTS

| | | | |
|---|---|---|---|
| 0060969 | 9/1982 | European Pat. Off. | 310/13 |
| 0235045 | 9/1987 | European Pat. Off. | 29/740 |
| 2637412 | 2/1978 | Fed. Rep. of Germany | 310/13 |
| WO8001861 | 9/1980 | PCT Int'l Appl. | 310/13 |
| 1308349 | 11/1970 | United Kingdom | 310/13 |

OTHER PUBLICATIONS

Abstract of Japanese Pat. No. 60-226732, Nov. 12, 1985.

*Primary Examiner*—Emanuel T. Voeltz
*Assistant Examiner*—Matthew Nguyen
*Attorney, Agent, or Firm*—Ronald P. Kananen

[57] ABSTRACT

A voice coil type actuator comprising a guide shaft formed of a material at least a portion in the radial direction in the cross-section of which is permeable, a movable member slidably supported on the guide shaft, a movable coil supported coaxially with the guide shaft on the movable member, a generally tubular yoke surrounding the movable coil and covering the range of the movement thereof, and a magnetic field generating magnet being contacted with the yoke. An axially extending cutout is formed in the yoke. A portion of the movable member projects through the cutout and supports thereon a displaceable member.

19 Claims, 15 Drawing Sheets

VOICE COIL TYPE ACTUATOR

This application is a continuation of application Ser. No. 07/701,811 filed May 17, 1991 now abandoned.

FIELD OF THE INVENTION

This invention relates to an actuator and, particularly to so-called voice coil type actuator or magnetic driven actuator adapted to linearly displace a displaceable member such as a movable lens in a lens system of a camera or a recording/reproducing head in a disc type recording and/or reproducing apparatus.

PRIOR ART

The actuator of the aforementioned type usually comprises a tubular movable member supporting thereon a movable coil and being supported slidably on such as a guide shaft; magnetic field forming elements consisting of mutually contacting magnets and a yoke being arranged to define an annular space for receiving the movable coil and to form a closed magnetic path with the magnetic flux passing through the movable coil in a direction perpendicular to the axis thereof; and a displaceable member being connected to the movable member, whereby the displaceable member is moved by a force acting when the movable coil is actuated.

FIG. 15 shows one example a of such prior art voice coil type actuator as disclosed in Japanese Patent Disclosure (Kokai) Hei/1 (1989)-19611.

In FIG. 15, shown at b is a housing of the actuator a and which is secured to a lens barrel c. Bearings d and d are mounted on the opposite ends of the housing b to support slidably a sliding shaft e in the axial direction. A yoke member f having a tubular outer yoke portion g and a front surface portion h closing one end of the outer yoke portion g is secured to the housing b coaxially with the sliding shaft e. A generally ring shaped magnet i is mounted on the inner surface of the front surface portion h of the yoke member f coaxially with the outer yoke portion g. The polarities of the magnet i are different in the axial directions. Further, a ring shaped inner yoke j is mounted on the rear surface of the magnet i so that the yoke member f, the magnet i and the inner yoke j act to constitute the closed magnetic path of the magnetic flux of the magnet i as shown in the arrow broken lines in the drawing. Shown at k in FIG. 15 is a movable member consisting of a generally disc shaped main portion l, a boss portion m projecting forward from the central portion of the main portion l and a generally tubular coil bobbin n projecting forward from the outer circumferential portion of the main portion l. The boss portion m is secured to and fitted on the sliding shaft e, and, the movable coil o is wound around the outer periphery of the bobbin n and is located in an annular space defined by the magnet i, the inner yoke j and the outer yoke g. Thus, the magnetic flux flows, with respect to the movable coil o, in a direction perpendicular to the axis thereof. Shown at p in the drawing is a lens retaining member for retaining a movable lens r in a generally tubular lens retaining portion q thereof. A connecting portion s of the lens retaining member p projects from the rear end of the outer circumference of the lens retaining portion q and is connected to a surface of the main portion l of the movable member k on the side opposite to the inner yoke j.

When the movable coil o is supplied with an actuating electric current, a force is applied to the coil o for displacing it in the direction determined by that of the electric current whereby, the movable member k, the sliding shaft e and the lens retaining member p displace integrally.

There are shortcomings in the prior art actuator a such that since the connection between the movable member k supporting the movable coil o and a displaceable member consisting of the lens supporting member p and the movable lens r is located at a location deviated from the axis of the movable coil o, therefore, the axial size of the actuator a increases by a size L.

Further, the inner yoke j and the outer yoke g for forming the closed magnetic path of the magnetic flux of the magnet i are arranged sequentially in a direction perpendicular to the axial direction, thus, the size in the radial direction will also increase.

SUMMARY OF THE INVENTION

An object of the present invention is to eliminate the above-described shortcomings and to provide a novel voice coil type actuator comprising a guide shaft formed of a material at least a portion in the radial direction in the cross-section of which being permeable, a movable member slidably supported the guide shaft, a movable coil supported coaxially with the guide shaft on the movable member, a generally tubular yoke surrounding the movable coil and covering the range of the movement thereof, a magnetic field generating magnet being contacted with the yoke, an axially extending cutout formed in the yoke, and a portion of the movable member projecting through the cutout for supporting a displaceable member.

According to the invention, the connection between a portion of the movable member supported on the guide shaft and the displaceable member or a member supporting the displaceable member is made at a location outside of the actuator; thus, it is possible to minimize the axial length of the actuator. Further, since the guide shaft supporting the movable member can act also as the inner yoke, it is possible not to provide separately the inner yoke, which enables to reduce the number of parts and to reduce the size in the direction perpendicular to the axial direction.

BRIEF DESCRIPTION OF THE DRAWINGS

The present invention will be more fully appreciated and understood from the following detailed description taken in conjunction with the drawings in which:

FIG. 1 through FIG. 4 show a first embodiment of the present invention as applied to an actuator displacing a movable lens in a lens system of a camera, in which FIG. 1 is a longitudinal sectional view showing the essential portion of a lens tube;

FIG. 2 is a section view taken along line II—II in FIG. 1;

FIG. 3 is a partially broken perspective view of the essential portion of FIG. 1;

FIG. 4 is a partially broken exploded view of the essential portion of FIG. 1;

DETAILED DESCRIPTION of PREFERRED EMBODIMENTS

First Embodiment (FIG. 1 through FIG. 4)

The first embodiment shown in FIG. 1 through FIG. 4 is a voice coil type actuator as applied to an actuator for displacing a movable lens in a lens system of a camera.

Firstly, it will be explained with respect to a lens tube provided with a desired lens system.

Figure 1:
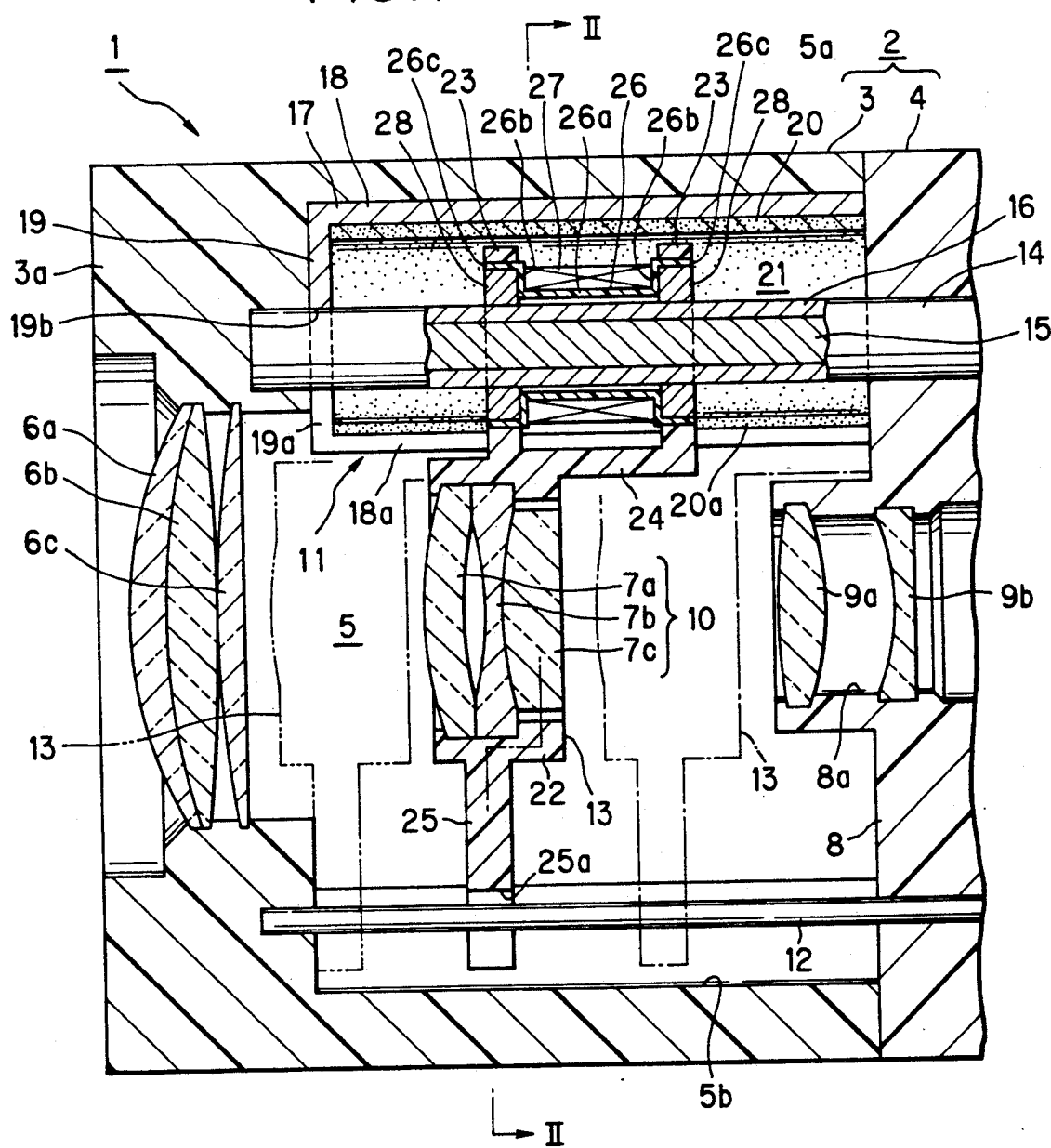
Figure 2:
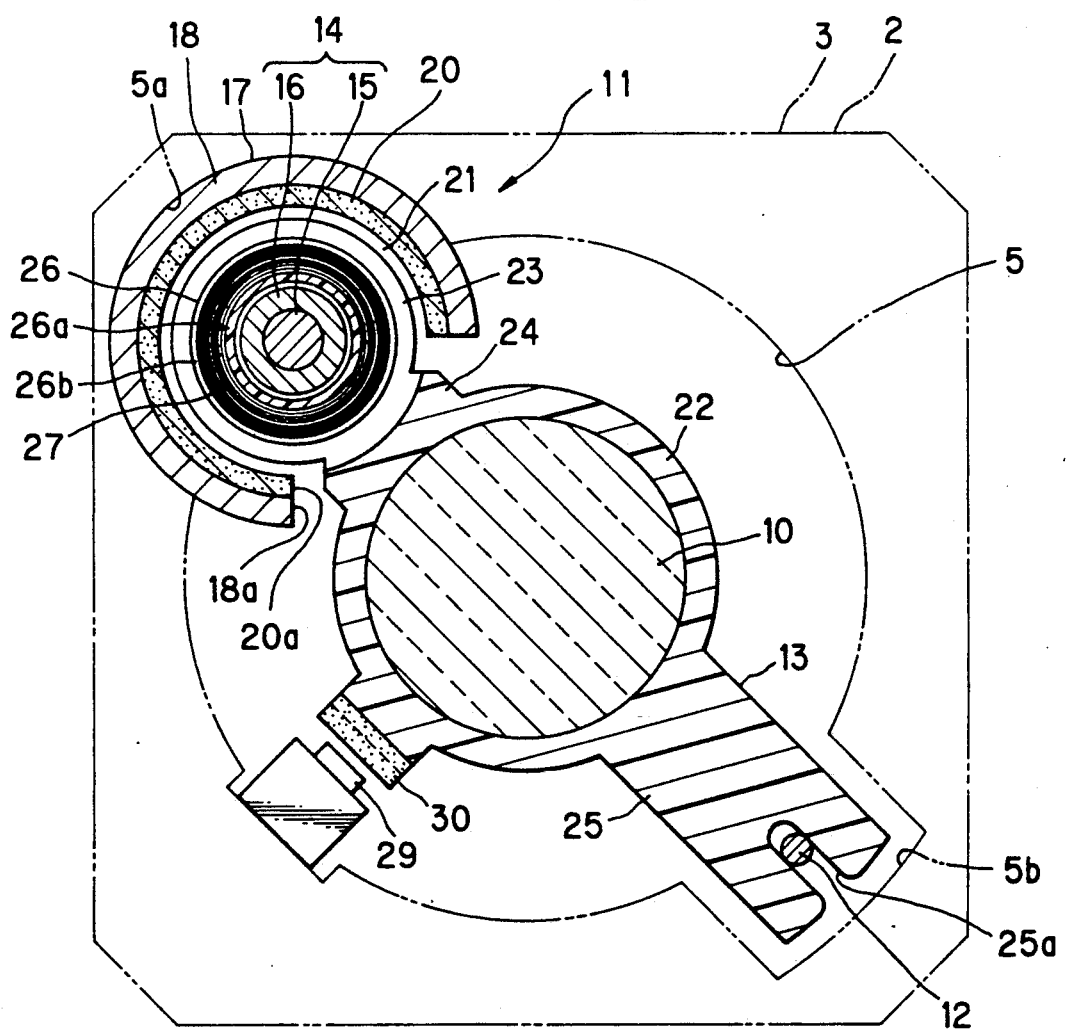
Figure 3:
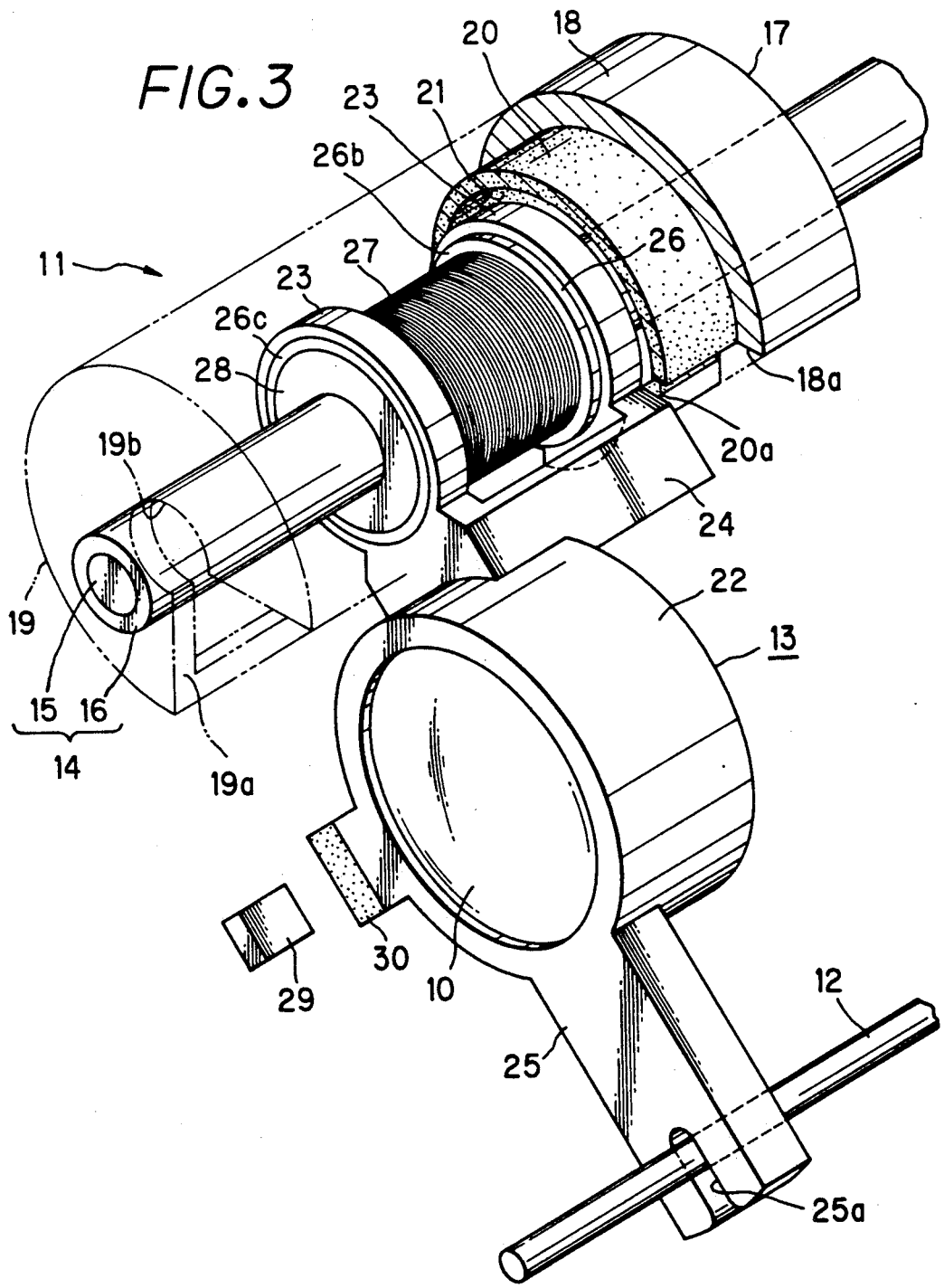
Figure 4:
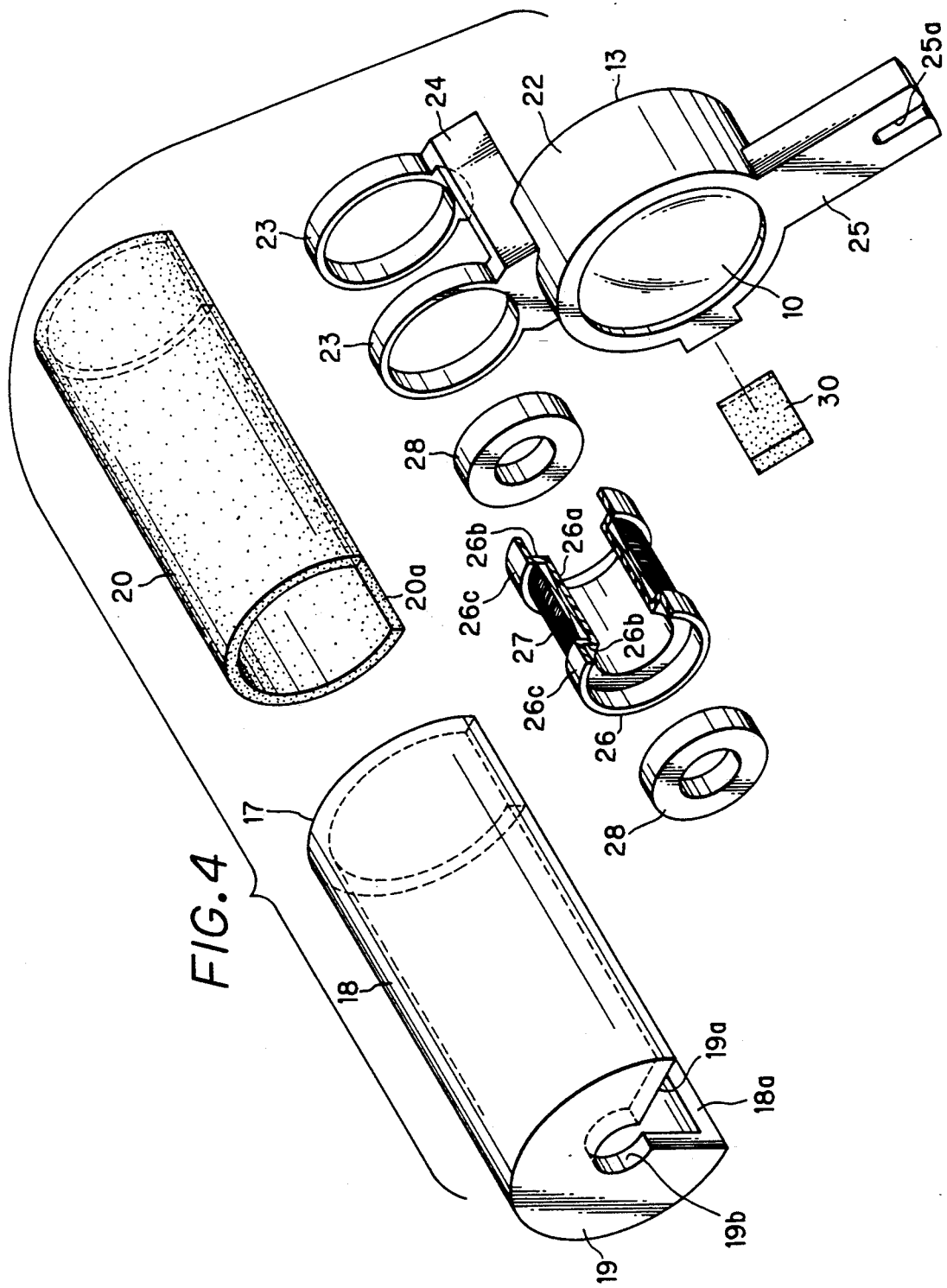

Lens Tube (FIG. 1)

A lens tube 1 (only the front portion is shown in the drawing) includes an outer shell 2 which is formed to have a generally prism like configuration (FIG. 2) by connecting a front shell 3 and a rear shell 4 with each other. The front shell 3 is formed to have a generally tubular inner space 5 opening in the front and rear end surfaces and, the rear shell 4 also defines therein a generally similar inner space.

There are provided in the inner space 5 lenses 6a, 6b, 6c, 7a, 7b and 7c respectively having predetermined light controlling function. In an opening 8a of an intermediate wall 8 constituting the front end of the rear shell 4 lenses 9a and 9b, are located and in the inner space (not shown) of the rear shell 4, a plurality of lenses (not shown) are provide with the optical axes of these lenses coinciding with one another. A lens group 10 consisting of the lenses 7a, 7b and 7c constitutes a movable lens for zooming.

Shown at 5a and 5b are recesses or grooves extending in the fore and aft directions and are formed in the inner periphery of the inner space 5. One of the recesses or grooves 5a has a generally C-shaped section for arranging the actuator, and the other 5b has a generally U-shaped section for arranging a guide portion.

The recesses 5a and 5b are disposed opposingly with respect to the axis of the inner space 5. A major portion of the voice coil type actuator 11 is disposed in the recess 5a, and a generally circular rod-like auxiliary guide shaft 12 is disposed in the recess 5b. The auxiliary guide shaft 12 extends in the fore and aft directions, with the opposite ends in the fore and aft directions respectively supported on the outer shell 2.

Shown at reference numeral 13 is a movable member supported slidably on a guide shaft 14 of the actuator 11 and also supported slidably on the auxiliary guide shaft 12 in the fore and aft directions. The movable member 13 is displaced by the actuator 11 and supports the movable lens groups 10. The movable member 13 moves between the positions shown by two dot chain lines and the position shown by one dot chain lines in FIG. 1.

Actuator (FIG. 1 through FIG. 4)

The actuator 11 consists of the movable member 13, a guide shaft 14, a movable coil supported on the movable member 13, a magnet and a yoke member being arranged to surround the movable coil throughout the range of the movement thereof, and the like.

Guide Shaft, Yoke Member

The guide shaft 14 consists of a generally rod shaped yoke portion 15 and a generally tubular guide portion 16. The yoke portion 15 is formed of a material of good permeability, and the guide portion 16 is preferably formed of a material of good permeability and good bearing characteristics such as an oil including metal and the like. The yoke portion 15 is tightly received in and is connected to the guide portion 16.

The guide shaft 14 is disposed in the central portion of the actuator arranging recess 5a in a direction parallel to the common optical axes of the lenses 6a, 6b, 6c, 7a, 7b, 7c, 9a, 9b and the like or in the fore and aft directions, with the opposite end portions of which respectively supported on the front wall 3a of the front shell 3 and on the intermediate wall 8 of the rear shell 4.

Shown at 17 is a yoke member, which consists integrally of a generally tubular outer yoke portion 18 and a generally disc shaped front surface portion 19 closing the front end of the tubular outer yoke portion 18. The yoke member 17 is formed of a good permeability material and, a cutout 18a is formed in the outer yoke portion 18 which cutout 18a is connected to a cutout 19a in the front surface portion 19. The cutouts 18a and 19a extend respectively along a range of about 90 degrees of the center angle with respect to the center of the yoke member 17. Thus, the yoke member 17 defines a generally C-shaped cross-section. The front surface portion 19 has a generally circular opening 19b in the central portion, and the opening 19b is connected to the cutout 19a. The inner diameter of the opening 19b corresponds to the outer diameter of the guide shaft 14.

The yoke member 17 is disposed in the actuator arranging recess 5a with the cutout portions 18a and 19a of the yoke member 17 facing the center of the inner space 5. The yoke member 17 is secured to the front shell 3, and the inner peripheral surface of the opening 19b in the front surface portion 19 is contacting with the outer peripheral surface of the guide shaft 14.

Magnet, Closed Magnetic Path

Shown at 20 is a magnet of a generally tubular shape having a cutout 20a in the circumferential direction. The cutout 20a extends generally along the center angle of about 90 degrees with respect to the central axis of the magnet 20. The outer diameter of the magnet 20 is equal to the inner diameter of the outer yoke portion 18. The polarity of the magnet 20 is such that the polarity is opposite in the direction perpendicular to the axial direction.

The magnet 20 is secured to the outer yoke portion 18 with the outer peripheral surface thereof contacting with the inner peripheral surface of the yoke portion 18 and the cutout 20a agrees with the cutout 18a.

The guide shaft 14, the magnet 20 and the yoke member 17 are coaxially arranged in the actuator arranging space 5a sequentially from the common center line, and a generally annular space 21 defined between the outer yoke portion 18 and the magnet 20 and the guide shaft 14 is communicated with the inner space 5 through the cutouts 18a, 19a and 20a.

The outer yoke portion 18 and the guide shaft 14 are connected magnetically through the front surface portion, whereby the magnetic flux of the magnet 20 makes a closed magnetic path routing through the magnet 20, the outer yoke portion 18, the front surface portion 19, the space 21, and the magnet 20.

Movable Member, Movable Coil

The movable member 13 comprises a short cylindrical lens retaining portion 22, generally ring shaped coaxial bearing portions 23, 23 positioned outside of the lens retaining portion 22, a connecting portion 24 connecting these bearing portions 23, 23 with the lens retaining portion 22, and a leg portion 25 projecting from the outer circumference of the lens retaining portion 22 in a direction toward the bearing portions 23, 23. The movable member 13 is an integral member formed preferably of synthetic resin material. The connecting portion 24 has a width in the left and right directions which is slightly smaller than the width of the cutout 20a (FIG. 2) and, has a generally rectangular plate-like shape elongated in the axial direction of the lens retaining portion 22, with the front end portion being connected to the lens retaining portion 22 at the position opposite to the leg portion 25. The bearing portions 23, 23 have the outer diameter slightly smaller than the inner diameter of the magnet 20 and, are arranged to project from the opposite end portions of the connecting portion 24 in the direction opposite to the lens retaining portion 22. A groove 25a is formed in the tip end of the leg portion 25.

The movable lens group 10 is retained by the lens retaining portion 22.

Shown at 26 is a coil bobbin, and comprises integrally a generally tubular coil winding portion 26a, flange portions 26b, 26b projecting radially outward from the opposite ends of the portion 26a respectively, bearing supporting portions 26c and 26c extending from the outer circumference of the flange portions 26b and 26b respectively in the directions separating from the coil winding portion 26a. The coil bobbin 26 is formed of insulating material. The inner diameter of the coil winding portion 26a is slightly larger than the outer diameter of the guide shaft 14.

A movable coil 27 is wound on the coil winding portion 26a, ring shaped bearing metals 28 and 28 are fitted forceably into the bearing retaining portions 26c, 26c of the coil bobbin 26 respectively. Further, respective bearing retaining portions 26c, 26c of the coil bobbin 26 are fitted forceably into the bearing portions 23, 23 of the movable member 13. Thus, the movable coil 27 is supported on the movable member 13.

The openings in the bearing metals 28, 28 slidably engage with the guide shaft 14, and the groove 25a in the leg portion 25 of the movable member 13 engages slidably with the auxiliary guide shaft 12.

The movable member 13 is supported slidably on the guide shaft 14 and on the auxiliary guide shaft 12 such that the member 13 is movable in the direction parallel to the optical axis of the movable lens 10. Only the bearing portions 23, 23 of the movable member 13 are located in the space 21 being surrounded by the outer yoke portion 18 and the magnet 20, and the remaining portion of the movable member 13 projects, through the cutouts 18a, 19a and 20a formed in the yoke member 17 and the magnet 20, outside of the space 21. The movable lens 10 is retained on the lens retaining portion 22 which is one element of the remaining portion of the movable member 13 projecting into the space 5.

The movable coil 27 is located in the space 21 with the axis of which extending in the direction perpendicular to the direction of the magnetic flux passing through the space 21.

Operation

When actuating electric current is supplied to the movable coil 27, the coil 27 receives a force to displace it in the axial direction and corresponding to that of the electric current, thus, the movable member 13 is moved forward or rearward, and the movable lens 10 is displaced in the axial direction.

In such actuator 11, the connection between the bearing portions 23, 23, which are portions of the movable member 13 and being supported on the guide shaft 14, and the lens retaining portion 22 for supporting the movable lens constituting the displaceable member is located outside of the actuator 11 in the radial direction, thus, it is not required to increase the axial length for disposing the connecting portion, and it is possible to minimize the axial length of the actuator 11.

Further, the yoke portion 15 constituting the radially inner portion of the guide shaft 14 acts as an inner yoke constituting a portion of the closed magnetic path, thus, it is not required to provide separately an inner yoke, which enables a reduction in the number of parts and the size of the actuator 11 in the direction perpendicular to the axial direction.

Shown at 29 is a Hall element mounted on the inner peripheral surface of the inner space 5, at 30 is an inclined magnet mounted on a projecting portion of the outer circumferential surface of the lens retaining portion 22 of the movable member 13. The Hall element 29 and the inclined magnet 30 constitute means for detecting the position of the movable member 13.

Figure 5:
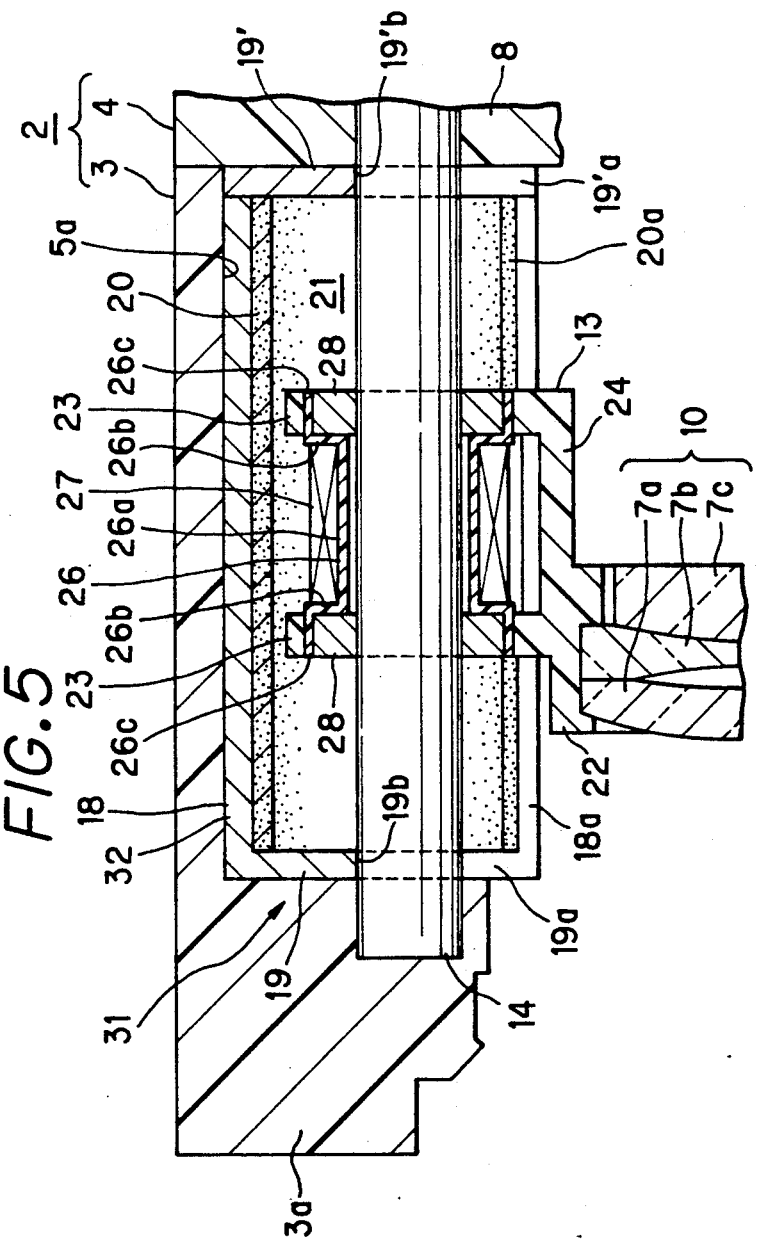
FIG. 5 is a sectional view of the essential portion of a voice coil type actuator according to a second embodiment of the present invention.
Figure 6:
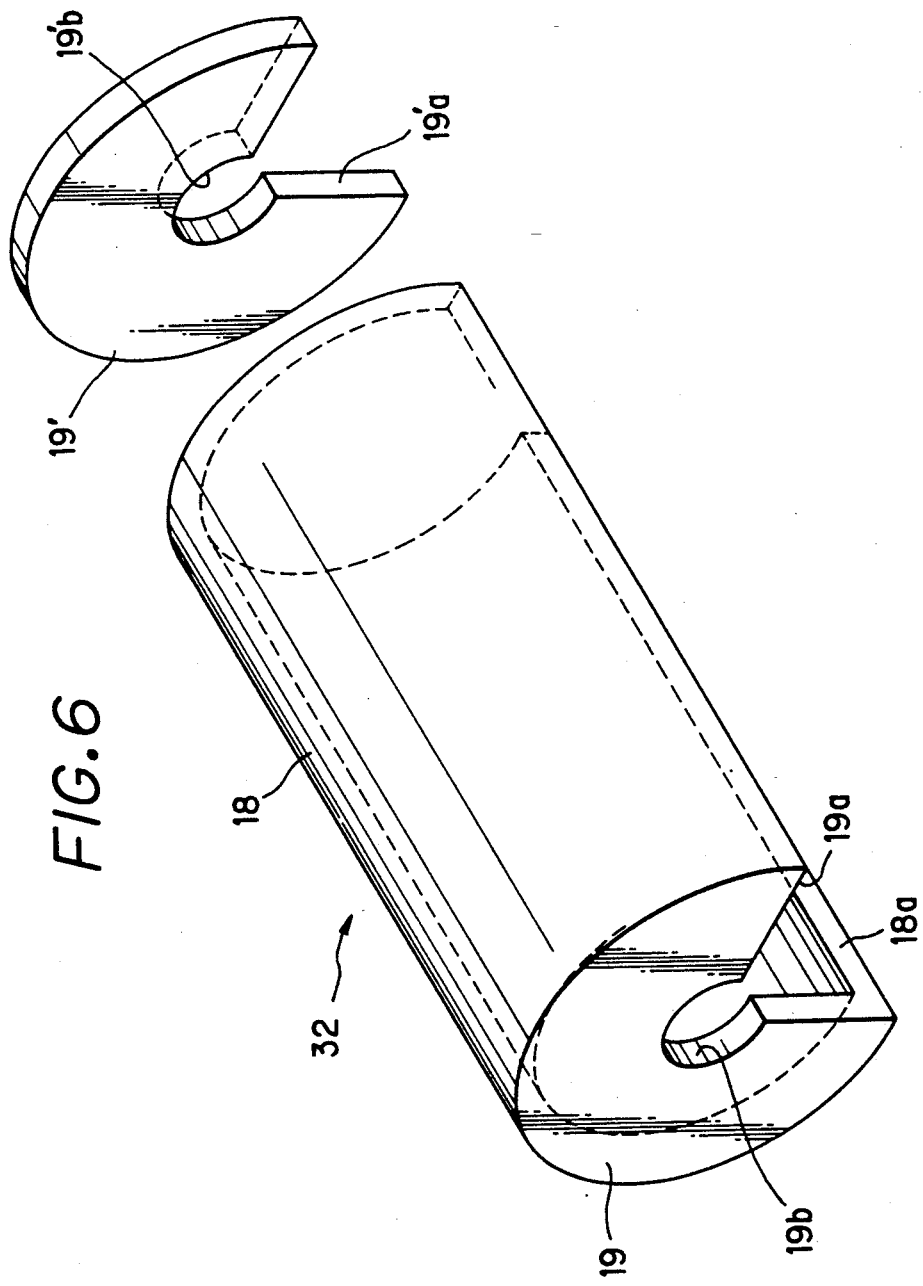
FIG. 6 is an enlarged exploded perspective view of a yoke member of the actuator of FIG. 5.

Second Embodiment (FIG. 5, FIG. 6)

There is shown in FIGS. 5 and 6 a voice coil type actuator 31 according to the second embodiment of the present invention. The second embodiment differs from the actuator of the first embodiment in that wall portions are provided on the opposite end portions of the outer yoke portion. Accordingly, only the essential portion is shown in the drawings and the description will mainly be made with respect to the different points, and the same reference numerals are applied to corresponding parts and detailed description therefor is omitted. Such reference numerals and the description are common to hereinafter described embodiments or the second through sixth embodiments.

Shown at numeral 32 is a yoke member which comprises an outer yoke portion 18, a front surface portion 19 formed integrally with the outer yoke portion, and a rear surface portion 19' secured to the rear end of the outer yoke portion and opposing the front surface portion 19. There are formed in the rear surface portion 19' a cutout 19'a corresponding to a cutout 19a in the front surface portion 19 and an opening 19'b corresponding to an opening 19b in the front surface portion 19. The inner peripheral surface of the opening 19'b contacts with the outer peripheral surface of the guide shaft 14 at the location near to the rear end thereof.

The outer yoke portion 18 and the guide shaft 14 are magnetically connected separately at locations near to the opposite ends through the front surface portion 19 and the rear surface portion 19'; Thus, there are formed two magnetic closed paths by the magnetic flux of the magnet 20; namely, a closed magnetic path passing respective front half portions of the magnet 20, the outer yoke portion 18, the guide shaft 14 and the space 21 and the front surface portion 19; and a closed magnetic path passing respective rear half portions of the magnet 20, the outer yoke portion 18, the guide shaft 14 and the space 21 and the rear surface portion 19'. Thus, respective halves of the magnetic flux of the magnet 20 flow along the above described two closed magnetic pathes respectively, and it is possible to prevent the saturation of the magnetic flux in the yoke member 32 without increasing the thickness of the yoke member. Thus, it is possible to reduce the size of the actuator and to make uniform the flux density along the length thereof throughout the length thereof.

Figure 7:
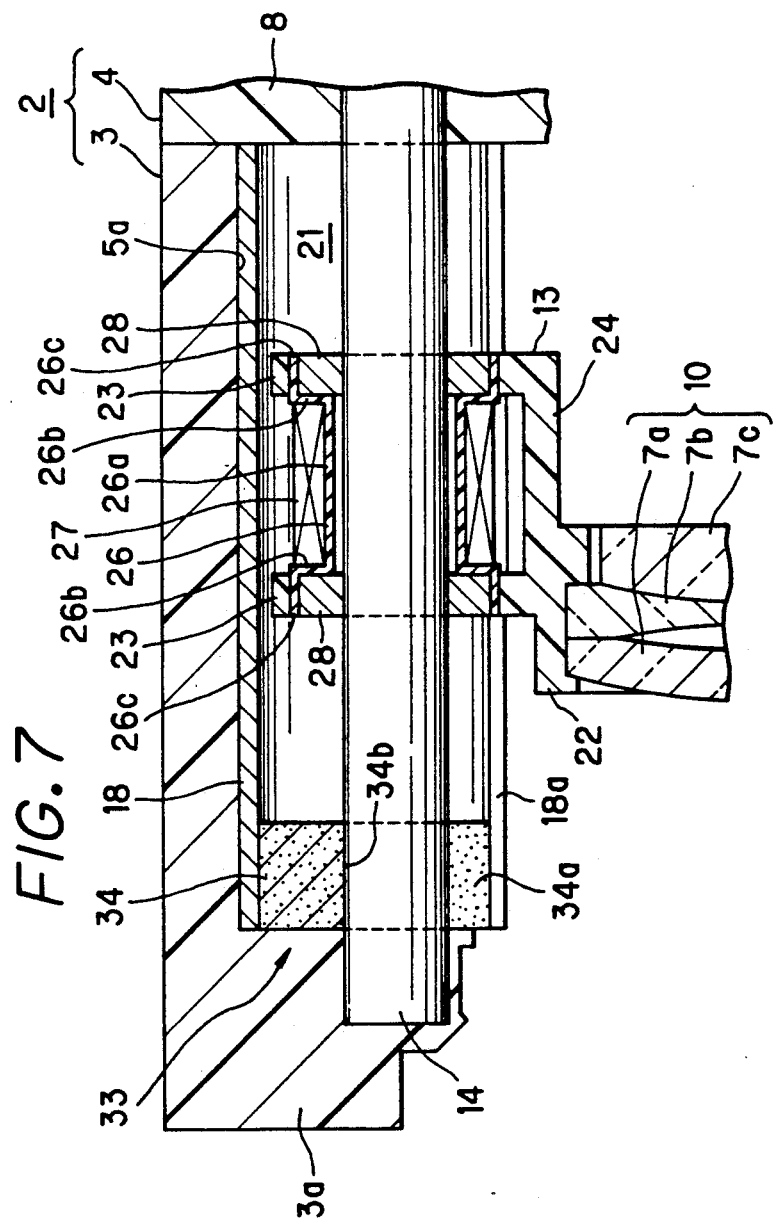
FIG. 7 is a sectional view of the essential portion of a voice coil type actuator according to a third embodiment of the present invention.
Figure 8:
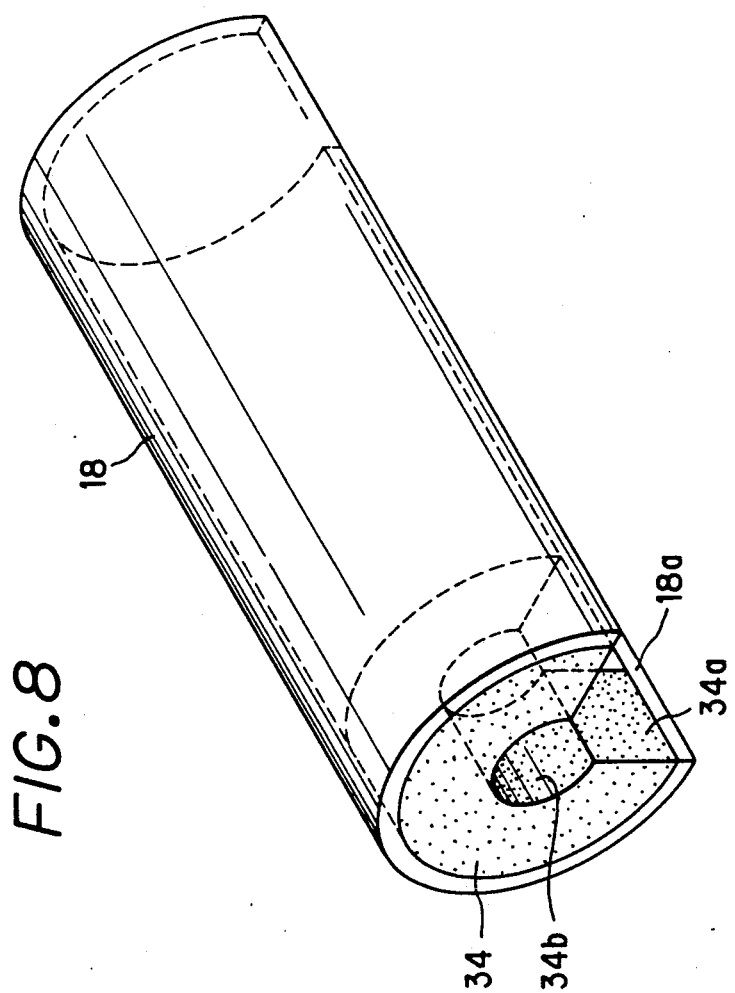
FIG. 8 is an enlarged exploded perspective view of the essential portion of the actuator of FIG. 7.

Third Embodiment (FIG. 7 and FIG. 8)

A voice coil type actuator 33 according to the third embodiment of the present invention is shown in FIGS. 7 and 8.

The difference between the actuator 33 and the actuator 11 shown in FIG. 1 through FIG. 4 is that the magnet acting as a source for generating the magnetic flux acts also as connecting means for connecting magnetically the outer yoke portion with the inner yoke portion.

Shown at 34 is a magnet of a relatively thick and generally disc shape. There are formed in the magnet 34 a cutout 34a corresponding the cutout 18a in the outer yoke portion 18 and an opening 34b in the central portion of the cutout 34a. The outer circumferential surface of the magnet 34 contacts with the inner peripheral surface of the front end portion of the outer yoke portion 18, and the inner circumferential surface of the opening 34b contacts with the outer peripheral surface of the guide shaft 14.

The magnet 34 is also formed to have the polarity being different in the direction perpendicular with respect to the axial direction.

The outer yoke portion 18 is an integral member.

Since the outer yoke member 18 and the guide shaft 14 are connected magnetically through the magnet 34, the magnetic flux of the magnet 34 forms a closed magnetic path passing through the magnet 34, the guide shaft 14, the space 21 and the outer yoke portion 18.

It will be understood that the outer yoke portion 18 of the actuator 33 takes the position where the magnet 20 of the actuator 11 is located. Therefore, according to the third embodiment, the size of the actuator in the direction perpendicular to the axial direction is further reduced.

Figure 9:
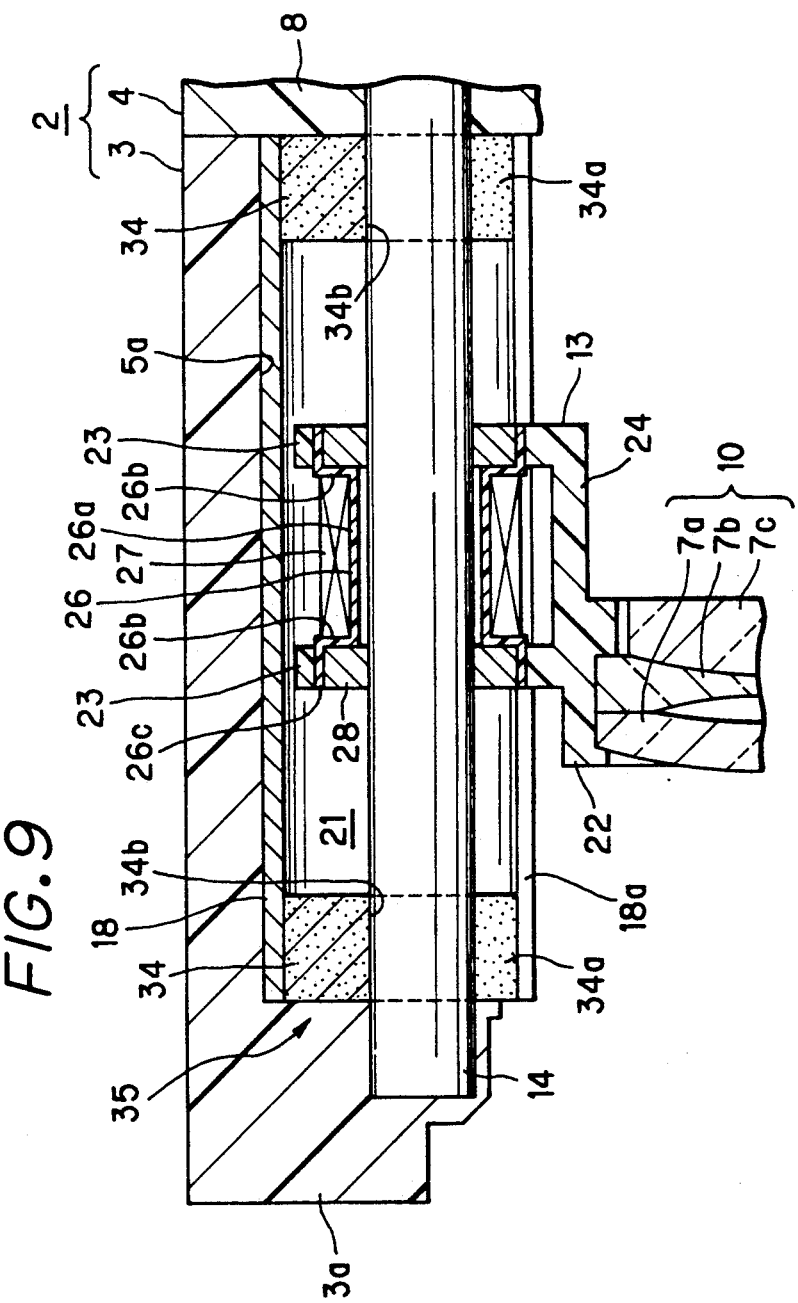
FIG. 9 is a sectional view of the essential portion of a voice coil type actuator according to a fourth embodiment of the present invention.
Figure 10:
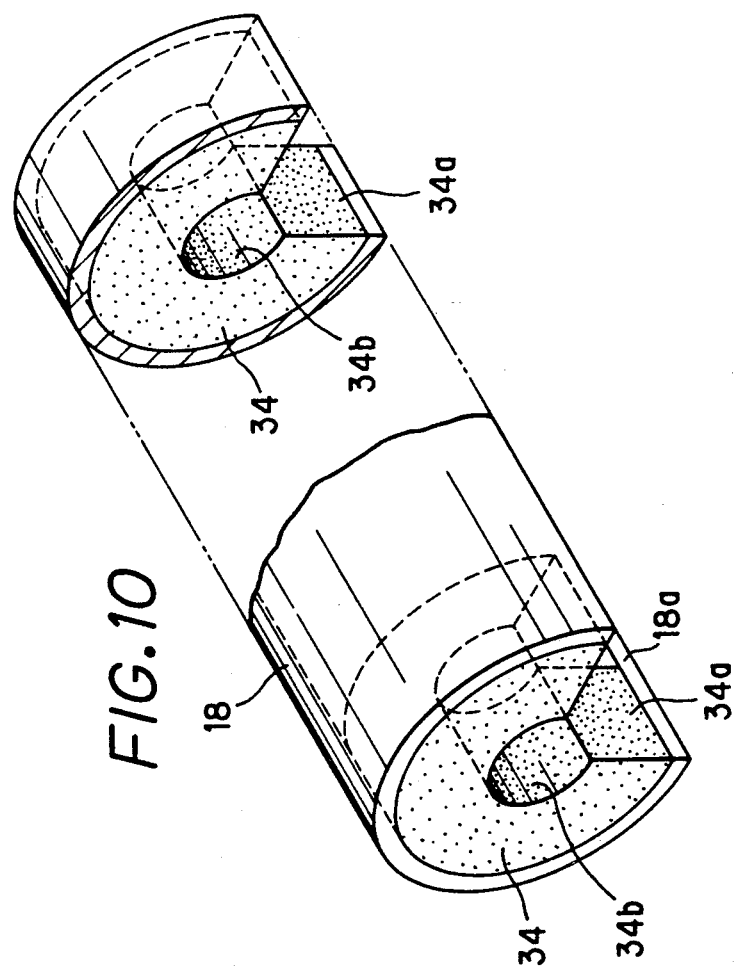
FIG. 10 is a partially broken enlarged perspective view of the essential portion of the actuator of FIG. 9.

Fourth Embodiment (FIG. 9 and FIG. 10)

An actuator 35 according to the fourth embodiment of the present invention is shown in FIGS. 9 and 10.

The actuator 35 differs from the actuator 33 according to the third embodiment of the invention in that two magnets are arranged on the opposite ends of the range of the movement of the movable coil.

In particular, in the actuator 35, two magnets 34, 34 are disposed in the opposite end portions of the outer yoke portion 18, with the outer circumferential surfaces of the magnets respectively contacting with the inner peripheral surfaces of the front and rear end portions of the outer yoke portion 18 respectively, and the openings 34b, 34b in the magnets 34, 34 respectively contacting the front and rear end portions of the guide shaft 14 respectively. Thus, the guide shaft 14 acting as an inner yoke and the outer yoke portion 18 are connected magnetically and respectively through the two magnets 34, 34 at the opposite end portions. Therefore, it is possible to substantially attain the uniformity of the density of the magnetic flux in the space 21 and along the length thereof.

Figure 11:
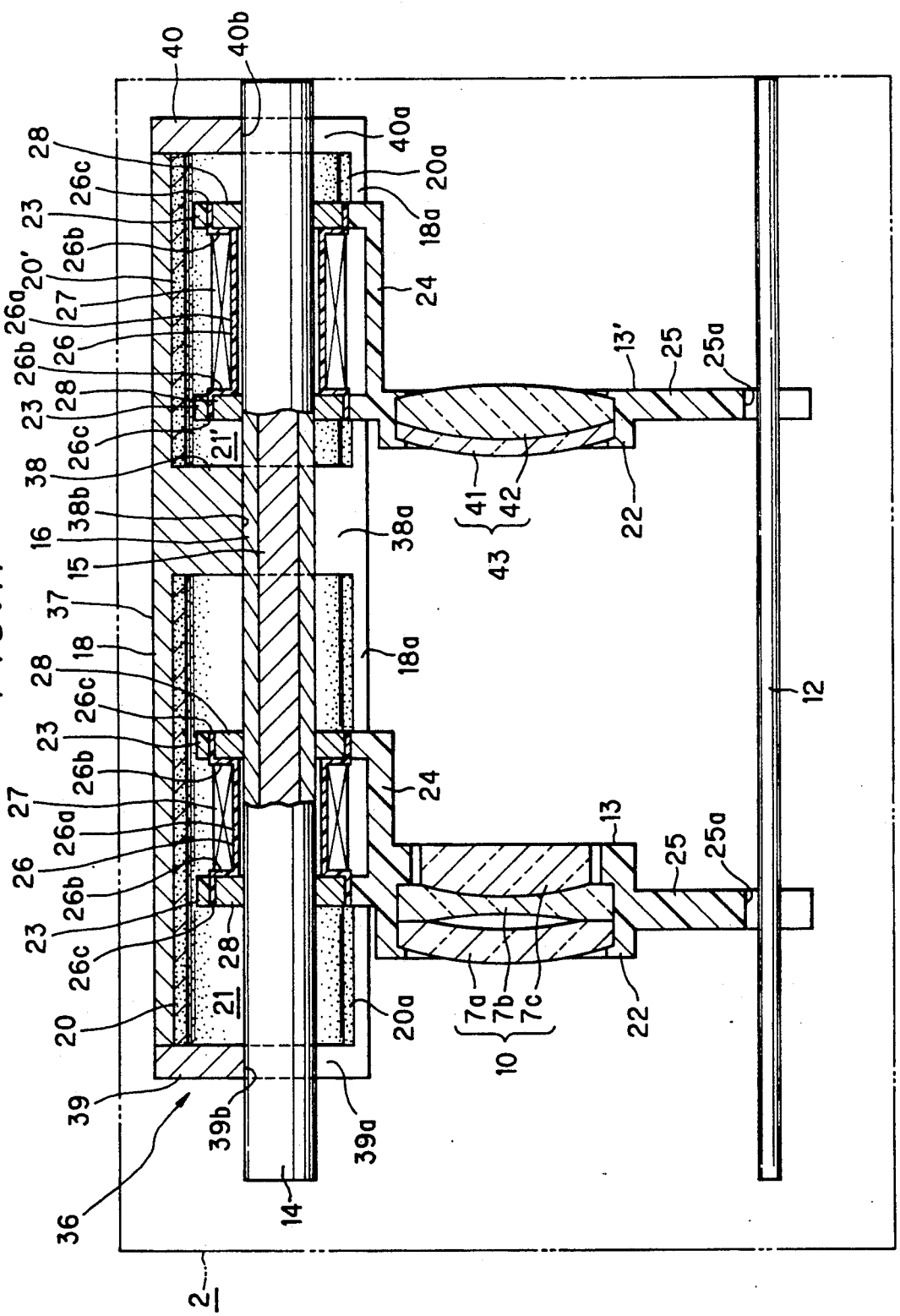
FIG. 11 is a longitudinal section view of the essential portion of a voice coil type actuator according to a fifth embodiment of the present invention.
Figure 12:
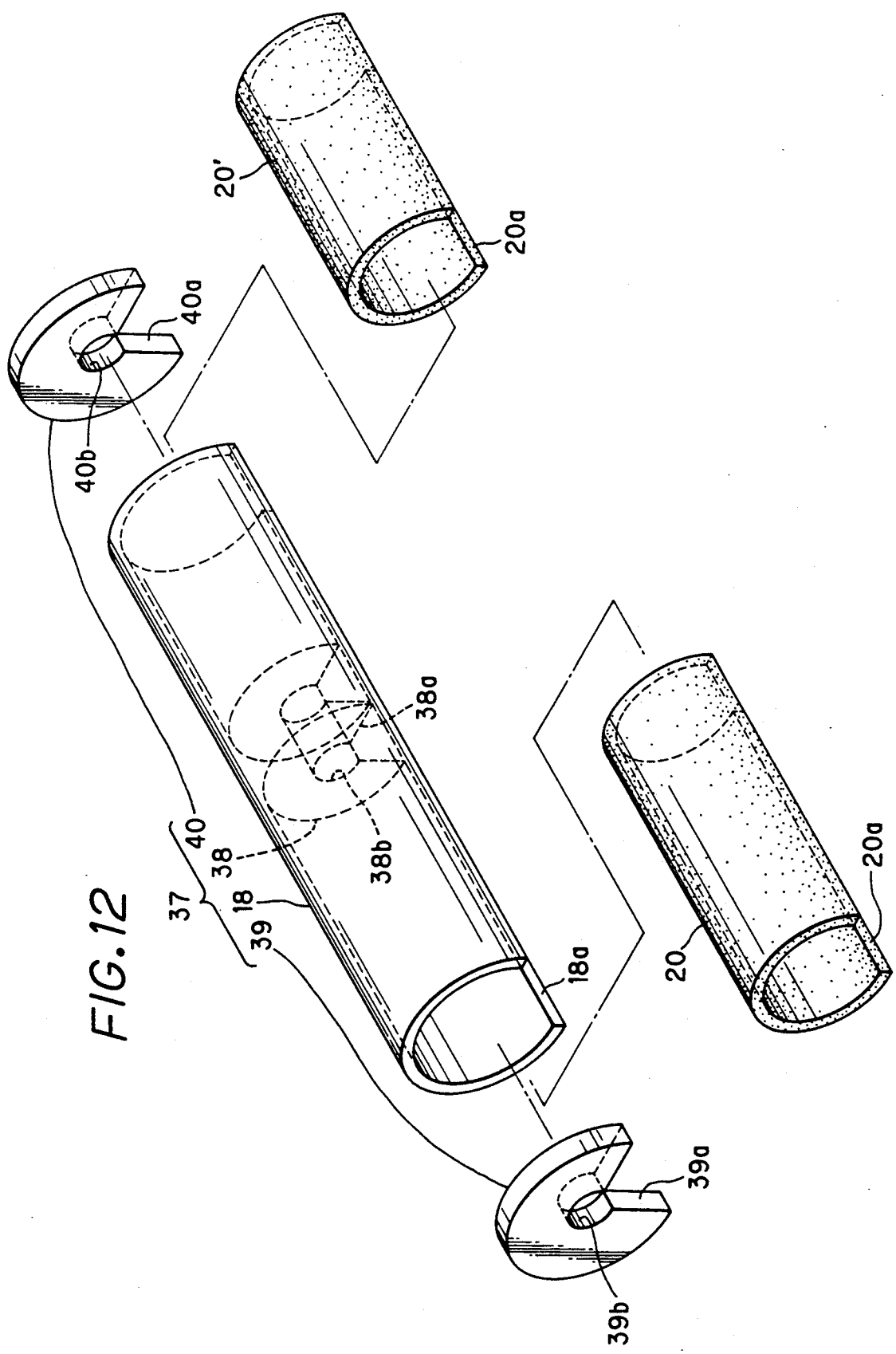
FIG. 12 is an enlarged exploded perspective view of the essential portion of the actuator of FIG. 11.

Fifth Embodiment (FIG. 11 and FIG. 12)

A voice coil type actuator 36 according to the fifth embodiment of the present invention is shown in FIG. 11 and FIG. 12.

The actuator 36 differs from the actuator 11 of the first embodiment mainly in that two movable members are moved separately by utilizing commonly one guide shaft and one yoke member.

In particular, shown at numeral 37 is a yoke member and consists of an outer yoke portion 18 and three connecting portions 38, 39 and 40. One of the connecting portions 38 is integrally formed with the outer yoke portion 18 and is positioned at a generally axial intermediate portion of and an inner side of the outer yoke portion 18. The remaining connecting portions 39 and 40 are respectively secured to the front and rear ends of the outer yoke portion 18 and close the opposite ends of the inner space thereof. The connecting portions 38, 39 and 40 are respectively formed to have cutouts 38a, 39a and 40a corresponding to the cutout 18a in the outer yoke portion 18, and also to have openings 38b, 39b and 40b respectively in the central portions of respective connecting portions. The inner circumferential surface of the opening 38b in the connecting portion 38 contacts with the outer peripheral surface of the axial intermediate portion of the guide shaft 14, the inner circumferential surface of the opening 39b in the front connecting portion 39 contacts with the outer peripheral surface of the portion near to the front end of the guide shaft 14 and the inner circumferential surface of the opening 40b in the rear connecting portion 40 contacts with the outer peripheral surface of the portion near to the rear end of the guide shaft 14.

There are disposed a magnet (referred hereinafter as a first magnet) 20 located at the inner side of the yoke member 37 and between the front connecting portion 39 and the intermediate connecting portion 38, and a magnet 20' (referred hereinafter as a second magnet) located at the inner side of the yoke member 37 and between the rear connecting portion 40 and the intermediate connecting portion 38. Respective magnets 20 and 20' are secured to the outer yoke portion 18 with the outer circumference of respective magnets 20 and 20' contacting with the inner peripheral surface of the outer yoke portion 18.

The polarity of the magnet 20 and that of the magnet 20' are determined to coincide in the direction perpendicular to the direction of the axes thereof.

The magnetic flux of the first magnet 20 makes a closed magnetic path passing through the outer yoke portion 18, the connecting portion 39, the guide shaft 14, the space 21 and the magnet 20, and also a closed magnetic path passing through the outer yoke portion 18, the connecting portion 38, the guide shaft 14, the space 21 and the magnet 20. The magnetic flux of the second magnet 20' makes a closed magnetic path passing through the outer yoke portion 18, the connecting portion 38, the guide shaft 14, the space 21' and the magnet 20', and also a closed magnetic path passing through the outer yoke portion 18, the connecting portion 40, the guide shaft 14, the space 21' and the magnet 20'.

Shown at 13 is a movable member (referred hereinafter as a first movable member) having a construction similar to that of the movable member 13 of the first embodiment and, at 13' is also a movable member (referred hereinafter as a second movable member) the construction of which being generally similar to the first movable member. Displaceable lens 43 consisting of lenses 41 and 42 is mounted on a lens retaining portion 22 of the movable member 13' for adjusting the focus of the camera.

The first movable member 13 has bearing portions 23, 23 being slidably supported on the guide shaft 14 at the location front side of the intermediate connecting portion 38, and the second movable member 13' has bearing portions 23, 23 being slidably supported on the guide shaft 14 at the location rear side of the intermediate connecting portion 38.

These movable members 13, 13' are independently moved by supplying actuating electric current separately to the movable coils 27, 27.

According to the actuator 36, it is possible to move two movable members 13, 13' independently with the yoke member and the guide shaft being commonly utilized, thus, it is possible to substantially reduce the number of parts as compared with the case where two actuators corresponding respectively to these two movable members 13, 13' are provided. Further, the length in the axial direction can also be reduced, and since two movable members 13, 13' are guided commonly by a single guide shaft, the attitude and the direction of the movement of the movable members 13, 13' can accurately be coincided with each other.

Figure 13:
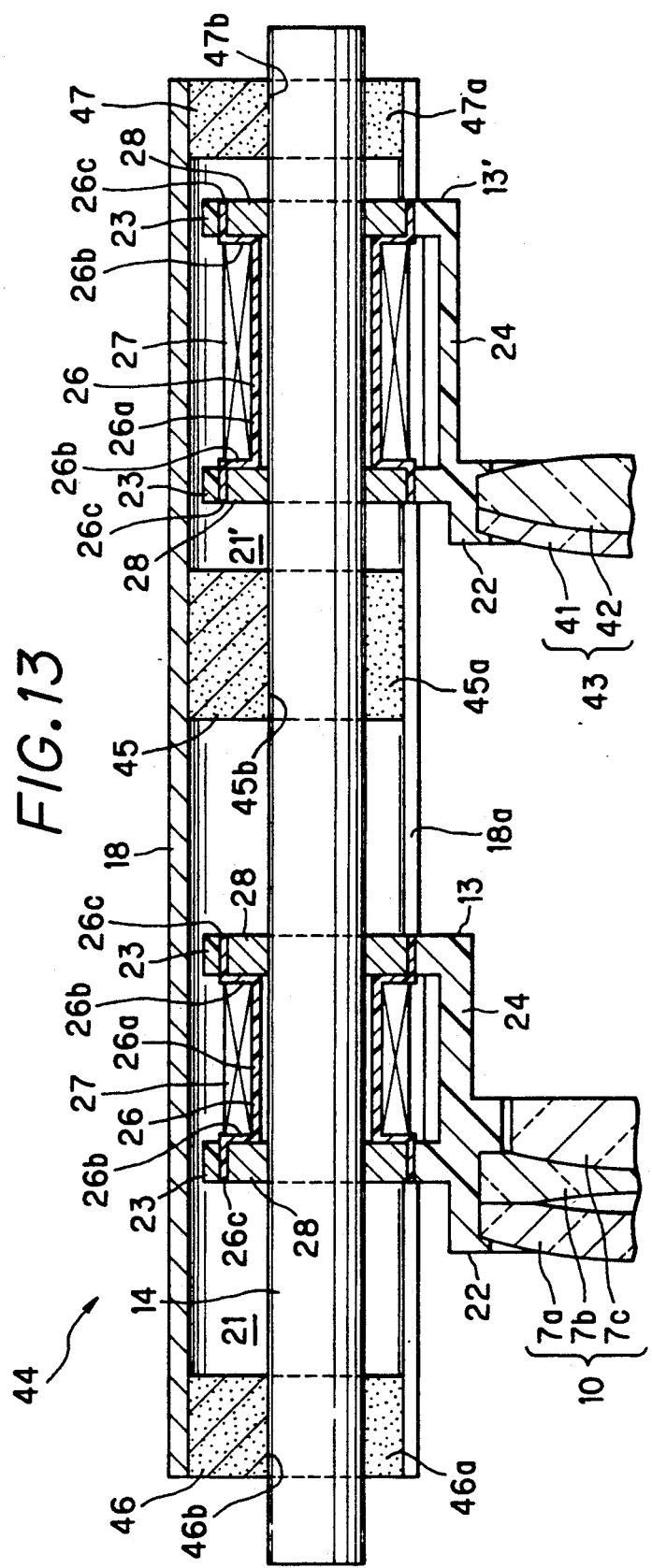
FIG. 13 is a section view of the essential portion of a voice coil type actuator according to a sixth embodiment of the present invention.
Figure 14:
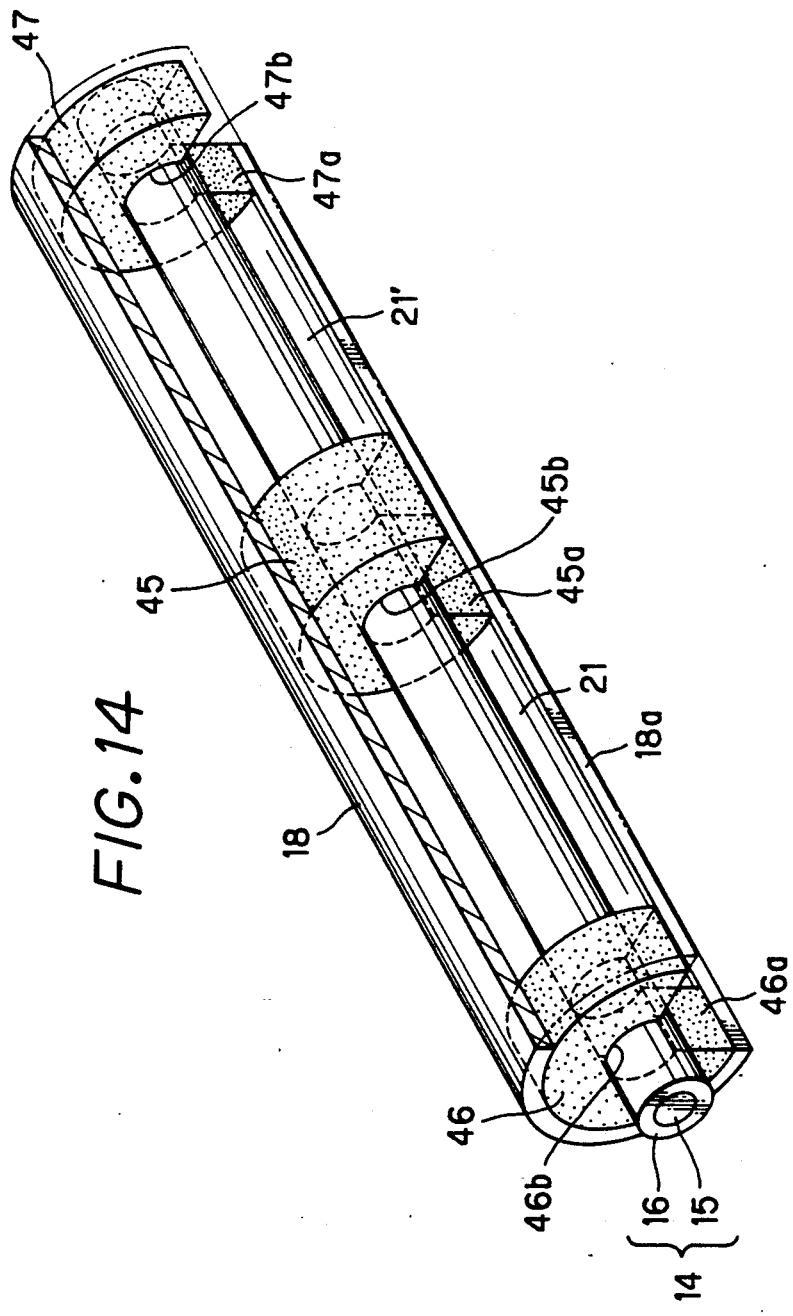
FIG. 14 is a partially broken section view of the essential portion of the actuator of FIG. 13.
Figure 15:
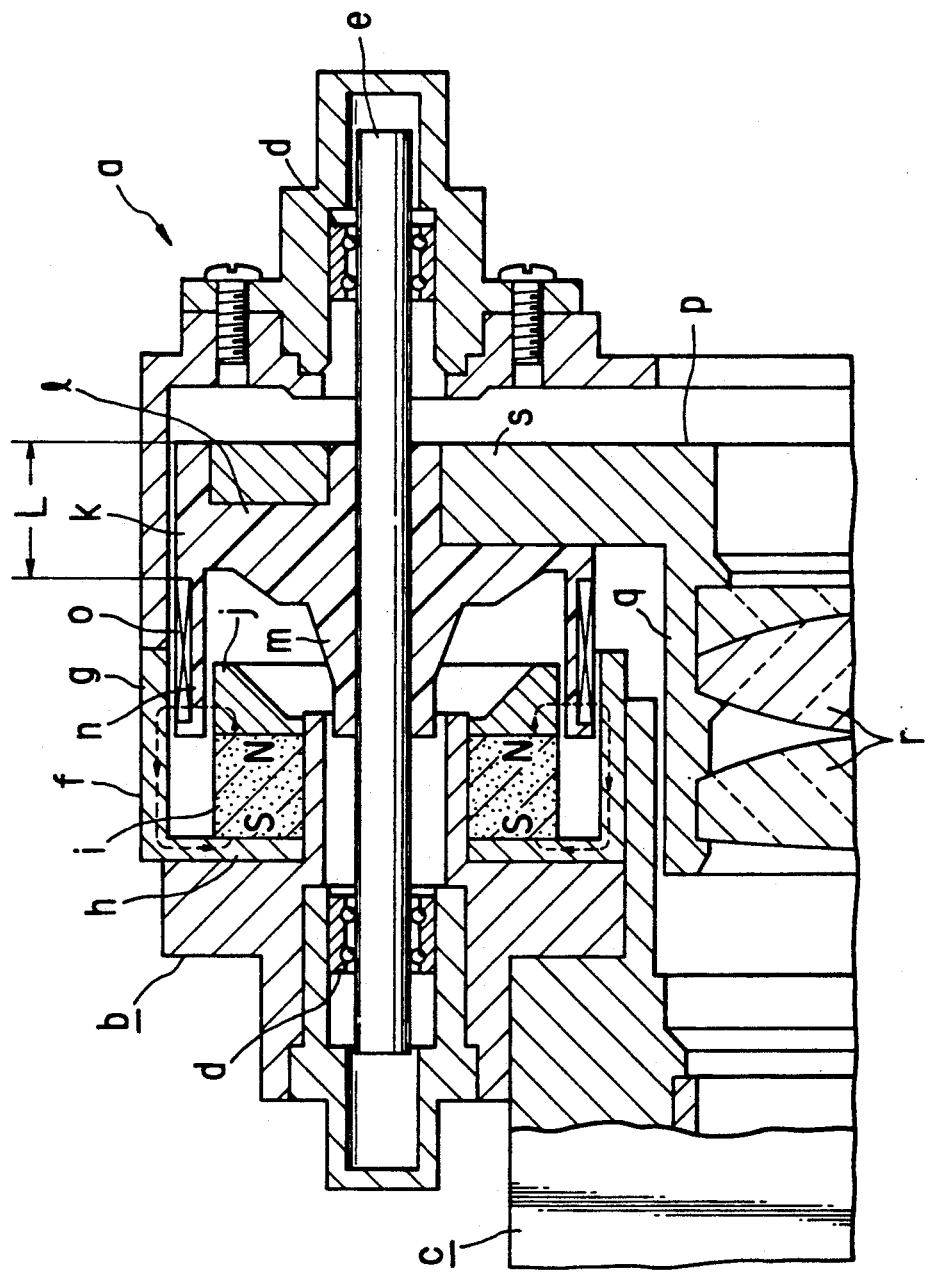
FIG. 15 is a longitudinal section view of one example of prior art voice coil type actuator.

Sixth Embodiment (FIG. 13 and FIG. 14)

A voice coil type actuator 44 according to a sixth embodiment of the present invention is shown in FIG. 13 and FIG. 14.

The actuator 44 differs from the actuator 36 of the fifth embodiment in that the function of the connecting portion connecting magnetically the outer yoke portion with the guide shaft is performed by the magnet.

Shown at 45, 46 and 47 are magnets having generally similar configurations as compared with the magnet 34 of the third embodiment. Further, there are provided in the respective magnets 45, 46 and 47 cutouts 45a, 46a and 47a corresponding to the cutout 18a in the outer yoke portion 18, and openings 45b, 46b and 47b in respective central portions of the magnets 45, 46 and 47 respectively. The inner circumferential surfaces of the openings 45b, 46b and 47b contact respective outer peripheral surfaces of the guide shaft 14.

The magnetic flux of the front magnet 46 forms a closed magnetic path passing through a portion of the outer yoke portion 18 and corresponding generally front half of the space 21, the space 21, the guide shaft 14, and the magnet 46. The magnetic flux of the rear magnet 47 forms a closed magnetic path passing through a portion of the outer yoke portion 18 and corresponding generally to the rear half of the space 21', the space 21', the guide shaft 14, and the magnet 47. Further, the magnetic flux of the central magnet 45 forms a closed magnetic path passing through a portion of the outer yoke portion 18 and corresponding generally to the rear half of the space 21, the space 21, the guide shaft 14, and the magnet 45 and also a closed magnetic path passing through a portion of the outer yoke portion 18 and corresponding generally to the front half of the space 21', the space 21', the guide shaft 14, and the magnet 45.

According to the actuator 44, it is possible to reduce the size in the direction perpendicular to the axial direction and to make uniform the density of the magnetic flux along the length thereof, whereby the actuator can be operated stable and reliable.

Advantages of the Invention

As described in detail heretofore, the voice coil type actuator according to the present invention comprises a guide shaft formed of a material at least a portion in the radial direction in the cross-section of which is permeable, a movable member slidably supported the guide shaft, a movable coil supported coaxially with the guide shaft on the movable member, a generally tubular yoke surrounding the movable coil and covering the range of the movement thereof, a magnetic field generating magnet being contacted with the yoke, an axially extending cutout formed in the yoke, and a portion of the movable member projecting through the cutout for supporting a displaceable member such as a movable lens.

Thus, according to the invention, since a portion of a movable member supported on the guide shaft is connected to a displaceable member or a member supporting the displaceable member at the location outside of the actuator, such connection does not require an increase in the axial length of the actuator, i.e., the axial length of the actuator can be reduced as compared with prior art actuators. Further, since the guide shaft for supporting the movable member acts also as an inner yoke, it is possible to omit an independent inner yoke, thereby reducing the number of parts and, further, it is possible to reduce the size in the direction perpendicular to the axial direction.

In the embodiments, the central portion of the guide shaft is formed of a material having good permeability, and the outer portion of the guide shaft is formed of a metal having a good bearing characteristics, which enables to attain smooth sliding movement.

It will be understood that the guide shaft may be formed of a material of good permeability throughout the entire section.

Further, in above described second, fourth, fifth and sixth embodiments, there are provided members for connecting magnetically the guide shaft and the outer yoke at two locations corresponding respectively to opposite ends of the range of the movement of the movable coil, whereby, the closed magnetic path formed by the magnet can be divided in the axial direction into two pathes, which enables a substantially uniform density of the magnetic flux with respect to the direction of the movement of the movable coil, and to substantially prevent the saturation of the magnetic flux in the magnetic path. Therefore, it is possible to reduce the size of the actuator in the direction perpendicular to the axial direction substantially.

Further, in the fifth and sixth embodiments, two spaces are formed independently for permitting the movement of respective two movable coils independently, with a single guide shaft and a single yoke being commonly utilized, whereby it is possible to coincide precisely and reliably the direction of the movement of two movable members and the attitude thereof.

In the embodiments described as above, the present invention is applied on voice coil type actuator for displacing diplaceable lenses in the lens system of a camera, however, the present invention is not limited to the embodiments and, can be applied to various voice coil type actuators for displacing displaceable members in the linear direction.

It will be understood that various modifications and changes may easily be applied for those skilled in the art without departing from the spirit and the scope of the present invention.

I claim:

1. A voice coil type actuator for linearly displacing a movable lens in a lens system of a camera, comprising:
   a guide shaft formed of a material, at least a portion in a radial direction in a cross-section of which is permeable;
   a movable member supporting said movable lens and slidably supported on the guide shaft;
   a movable coil supported coaxially with the guide shaft on the movable member;
   a generally tubular yoke surrounding the movable coil and covering a range of a movement of the movable coil;
   a magnetic field generating magnet being contacted with the yoke and having a cutout corresponding to an axially extending cutout formed in the yoke; and
   a portion of the movable member projecting through the cutouts of the magnetic field generating magnet and the yoke for supporting said movable lens for linear movement with said movable member in said camera.

2. A voice coil type actuator according to claim 1, in which said magnetic field generating magnet has a generally cylindrical shape having a cutout corresponding to the cutout in said yoke and on outer circumferential surface contacting with an inner circumferential surface of said yoke.

3. A voice coil type actuator according to claim 1, in which said magnetic field generating magnet has a generally disc shape having a cutout corresponding to the cutout in said yoke and an outer circumferential surface contacting with an inner circumferential end surface of said yoke.

4. A voice coil type actuator according to claim 3, in which said disc shaped magnetic field generating magnet is provided at each of opposite end portions of said yoke.

5. A voice coil type actuator according to claim 1, in which a plurality of said movable members are provided with a single guide shaft and a single yoke being commonly provided for said movable members.

6. A voice coil type actuator according to claim 5, in which a plurality of magnetic field generating magnets are provided, with each of which being of a generally cylindrical shape having a cutout corresponding to the cutout in said yoke and an outer circumferential surface thereof contacting with an inner circumferential surface of said yoke.

7. A voice coil type actuator according to claim 5, in which a plurality of magnetic field generating magnets are provided, with each of which being of a generally disc shape having a cutout corresponding to the cutout in said yoke and an outer circumferential surface thereof contacting with an inner circumferential surface of said yoke.

8. A voice coil type actuator according to claim 1, in which there are provided means for detecting the position of the movable member being mounted on the movable member, and a detecting element mounted on the inner surface of a main body of the movable member thereby detecting the position thereof.

9. A voice coil type actuator according to claim 8, in which said means for detecting the position of the movable member is an inclined magnet.

10. A voice coil type actuator according to claim 8, in which said means for detecting the position of the movable member is a Hall element.

11. The actuator as set forth in claim 1 further including an auxiliary guide shaft, said movable member also being slidably supported on said auxiliary guide shaft for movement in fore and aft directions.

12. The actuator as set forth in claim 1 further including a casing defining an optical axis, said guide shaft extending substantially parallel to said optical axis so that said movable lens moves along said optical axis when said movable member is moved.

13. The actuator as set forth in claim 12 wherein said cutout in said yoke faces said optical axis within said casing.

14. The actuator as set forth in claim 12 wherein said yoke has an outer yoke portion and a generally disc-shaped front surface portion closing an end of the outer yoke portion, wherein the guide shaft, the magnet, and the yoke member are coaxially arranged in a space in said casing for said actuator, the outer yoke portion and the guide shaft being connected magnetically through the front surface portion of said yoke member whereby magnetic flux of the magnet makes a closed magnetic path routing through the magnet, the outer yoke portion, the front surface portion, the space between the outer yoke portion and the magnet.

15. The actuator as set forth in claim 14 wherein said yoke further includes a rear surface portion, wherein two magnetic closed paths are formed respectively in the front and rear half portions of the yoke.

16. The actuator as set forth in claim 12 further including a second magnet in contact with a portion of said yoke opposite said magnetic field generating magnet, said guide shaft acting as an inner yoke, so that said inner yoke and the outer yoke are connected magnetically and respectively through the two magnets at the opposite end portions of said yoke, whereby a substantial uniformity of a density of the magnetic flux in a space within the casing is attained.

17. The actuator as set forth in claim 1 wherein a portion of the moveable member which supports said movable lens is located outside of the actuator structure, whereby such connection does not require an increase in the axial length of the actuator.

18. The actuator as set forth in claim 1 further including means for connecting magnetically the guide shaft and the yoke at lest two locations corresponding respectively to opposite ends of a range of movement of the movable coil, whereby the closed magnet path from the magnet is divided in the axial direction into at least two paths, enabling a substantially uniform density of the magnetic flux with respect to the direction of the movement of the movable coil and to prevent substantially a saturation of the magnetic flux in the magnetic path, thus reducing the size of the actuator in a direction perpendicular to the axial direction.

19. An actuator for displacing a movable lens in a lens system of a camera, comprising:
  a lens tube defining respective adjacent inner spaces for said actuator and for said lens system, said lens system including said movable lens movable along an optical axis in said tube, an inner surface of said inner space for said actuator defining a recess extending substantially coaxially with said optical axis for arranging the actuator, an inner surface of said inner space also defining means for arranging a guide portion including an auxiliary guide shaft for said movable lens, said actuator comprising:
  a guide shaft formed of a material, at least a portion in a radial direction in a cross-section of which is permeable, said guide shaft extending substantially coaxially with said optical axis;
  an auxiliary guide shaft supported in said lens tube at a position which is substantially coaxial with said optical axis;
  a movable member substantially located in said actuator inner space of said casing and supported slidably on said guide shaft of the actuator and the auxiliary guide shaft in a fore and aft directions, said movable member being displaced by the actuator between opposed positions in said inner space;
  a moveable coil supported on the movable member;
  a generally tubular yoke surrounding the movable coil and covering a range of movement of the movable coil;
  a magnet for generating a magnetic field, said magnet being arranged to surround the movable coil through the range of movement of the movable coil;
  an axially extending cutout formed in the yoke; and
  a portion of said movable member which supports said movable lens projecting through the cutout from the actuator portion of the inner space to the lens portion of the inner space of said casing.

* * * * *